United States Patent [19]

Hayashi

[11] Patent Number: 5,640,392
[45] Date of Patent: Jun. 17, 1997

[54] SIGNAL RECEIVING APPARATUS

[75] Inventor: Minobu Hayashi, Tokyo, Japan

[73] Assignee: Sony Corporation, Tokyo, Japan

[21] Appl. No.: 499,457

[22] Filed: Jul. 7, 1995

[30] Foreign Application Priority Data

Jul. 15, 1994 [JP] Japan .................. 6-186285

[51] Int. Cl.$^6$ .................................. H04J 3/00
[52] U.S. Cl. .................. 370/395; 348/465; 370/498
[58] Field of Search .................. 370/58.1, 58.2, 370/58.3, 60, 60.1, 61, 81, 82, 91, 94.1, 94.2, 94.3, 110.1, 112, 118, 111

[56] References Cited

U.S. PATENT DOCUMENTS

| | | | |
|---|---|---|---|
| 4,587,650 | 5/1986 | Bell | 370/86 |
| 4,637,014 | 1/1987 | Bell et al. | 340/825.05 |
| 4,763,321 | 8/1988 | Calvignac et al. | 370/94.1 |
| 4,914,650 | 4/1990 | Sriram | 370/60 |
| 5,392,280 | 2/1995 | Zheng | 370/94.2 |

OTHER PUBLICATIONS

IEEE Standards Draft P1394/Draft 6.4v0, Oct. 14, 1993, pp. 179–192.

*Primary Examiner*—Douglas W. Olms
*Assistant Examiner*—Ajit Patel
*Attorney, Agent, or Firm*—Jay H. Maioli

[57] ABSTRACT

In a communication system, isochronous data can be continuously received without any interruption, and also asynchronous data irregularly transmitted can be received in a signal receiving apparatus. The signal receiving apparatus is arranged by comprising isochronous data being regularly transmitted; asynchronous data being irregularly transmitted; a common bus for transferring the isochronous data and the asynchronous data thereon; and temporary storage means for writing therein the received isochronous data and the received asynchronous data, respectively.

8 Claims, 4 Drawing Sheets

CSP : cycle starting packet
Ack : Acknowledge

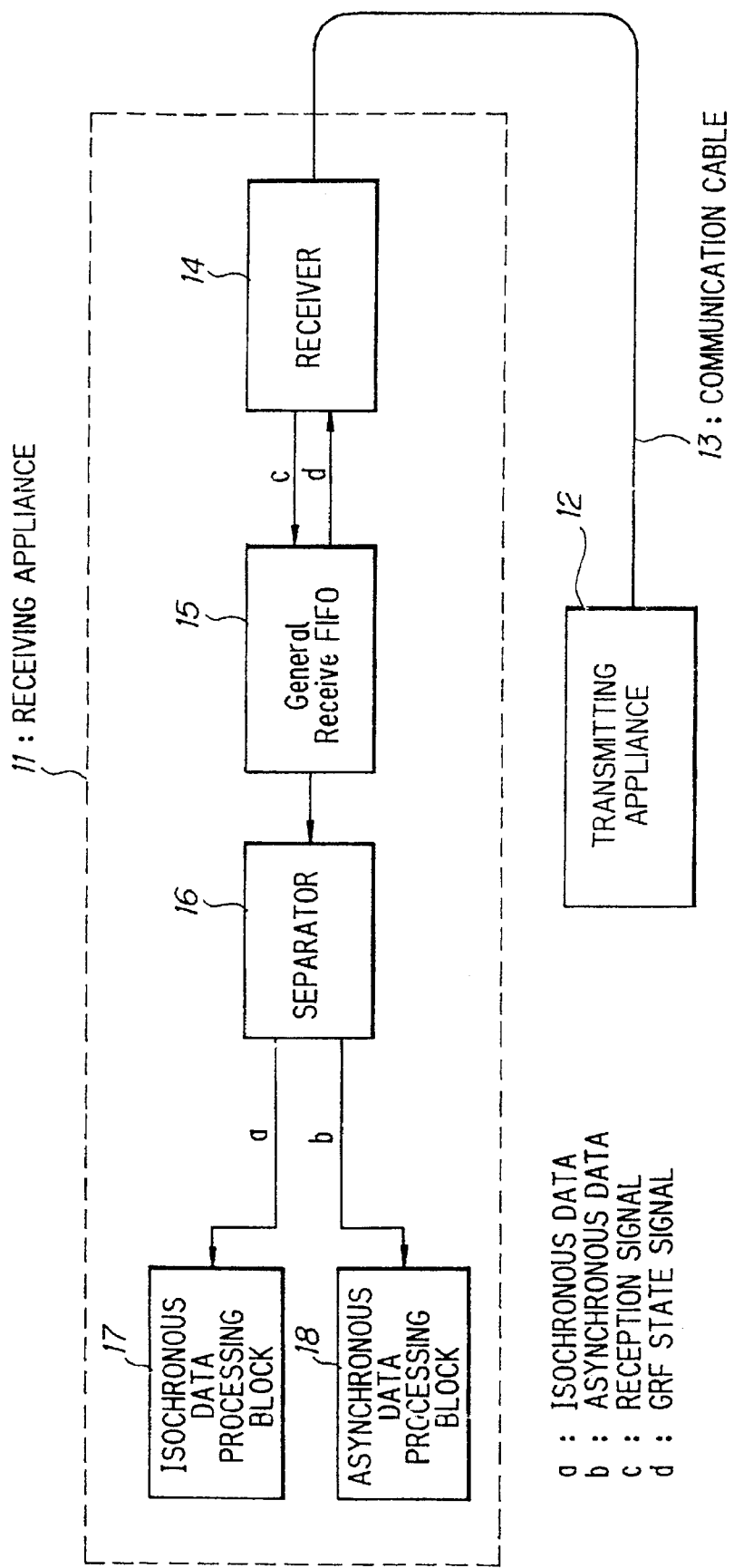

SIGNAL RECEIVING APPARATUS

BACKGROUND OF THE INVENTION

1. Field of the Invention

The present invention relates to a signal receiving apparatus employed in a data communication system for performing a data communication among a plurality of electronic appliances mutually connected via a communication control bus. In this signal receiving apparatus, isochronous data irregularly received is transferred to a data processing unit without losing the isochronous data while asynchronous data continuously received every predetermined time period is not transferred to the data processing unit uninterrupted.

2. Description of the Related Art

A communication system is conceivable such that a plurality of electronic appliances ("appliances" hereinafter) are connected by a communication control bus such as the P1394 serial bus on which a control signal and an information signal can be handled in a mixed manner, and then the information signal and the control signal are communicated.

It should be noted that a detailed description about the P1394 serial bus involving the node ID allocation sequence is given in "IEEE P1394 Serial Bus Specification," issued on Oct. 14, 1993.

Six Patent Applications have been filed by the Applicant as the related art:

1. EPO Patent Laid-open No. 0614297
2. Japanese Patent Application No. 05126682
3. Japanese Patent Application No. 05200055
4. Japanese Patent Application No. 06051246
5. Japanese Patent Application No. 06134940
6. Japanese patent Application No. 06165883

These six patent applications have been filed as U.S. corresponding patent applications.

In FIG. 2, there is shown an example of a communication system. This communication system is comprised of appliances A, B, C, D and E. Then, twisted-pair cables of the P1394 serial bus are employed so as to connect the appliances A and B; A and C; C and D; and C and E. These appliances are for instance, a digital VTR, a tuner, a monitor, a personal computer and so on. Since each of these appliances are able to relay an information signal and a control signal, which are input from the twisted-pair cables, this system is equivalent to such a system where the respective appliances are connected to a common P1394 serial bus.

As represented in FIG. 3, the data transmission among the appliances A to E which commonly share the bus is carried out in a time division multiplex every predetermined communication cycle (for example, 125 μsec). The communication cycle on the bus is managed by a so-termed "cycle master". That is, the appliance A transfers an isochronous packet (cycle start packet) indicative of starting of the communication cycle to other appliances on the bus. Then, as a result, the data transmission in this communication cycle is commenced.

As a format of data transmitted within one communication cycle, there are two sorts of data, namely, isochronous data such as video data and audio data, and asynchronous data such as an operation command of an appliance. A packet of isochronous data (an "isochronous packet" hereinafter) is transmitted with priority, with respect to a packet of asynchronous data (an "asynchronous packet" hereinafter).

A plurality of isochronous packets may be discriminated from each other by attaching channel numbers 1, 2, 3, ..., to the respective isochronous packets. The time period after all of the appliances which want to transmit the isochronous packets have transmitted the isochronous packets, and until the next cycle start packet, is used to transmit the asynchronous packet. It should be noted that FIG. 3 represents only one isochronous packet within one communication cycle.

An isochronous packet is continuously transmitted in every communication cycle until a transmission appliance has completed transmission of data to be transmitted. On the other hand, an asynchronous packet is only transmitted if required. There is no problem, even when an asynchronous packet could not be transmitted in a certain communication cycle, when the asynchronous packet can be transmitted within a predetermined time period. To the contrary, an isochronous packet should be transmitted within every communication cycle.

Each of the appliances connected to the bus identifies the isochronous data directed to it from the channel numbers written into the isochronous packet, and also identifies the asynchronous data directed to it from the node IDs (namely, physical addresses of respective appliances, to which the node IDs are automatically allocated based on connecting relationship when respective appliances are connected to P1394 serial bus) written into the asynchronous packet.

FIG. 4 is a block diagram for indicating an arrangement of a data receiving portion of an appliance employed in a communication system. As previously explained, a receiving appliance 11 and a transmitting appliance 12 are a digital VTR, a monitor, a personal computer and so on. More than one input/output port (not shown) of the respective appliances are connected with each other via two sets of communication cables (twisted-pair cables) 13 used to input/output data. It should be noted that although one appliance employed in the communication system receives the data from the other appliance, as shown in FIG. 4, there are other cases. For instance, either the appliance A, or the appliance C of FIG. 2, may receive data from more than two other appliances within the same communication cycle, or transmit/receive data to/from them.

The data transmitted from the transmitting appliance 12 is inputted via the communication cables 13 to a receiver 14 of the receiving appliance 11. To the receiver 14, a GRF state signal "d" is entered from a general receive FIFO 15 (a "GRF" hereinafter). Then, the receiver 14 can write a reception signal "c" into the GRF 15 unless this GRF state signal "d" is equal to "Full".

The receiver 14 identifies whether the packet of the reception signal "c" corresponds to an isochronous packet, or an asynchronous packet based upon the header of this packet. Then, when the reception signal "c" corresponds to the asynchronous packet and this asynchronous packet can be written into the GRF 15, the receiver 14 returns "OK Ack (Acknowledge; positive response)" indicative of reception OK to the transmitting appliance 12. When the GRF state signal "d" is "Full", the received asynchronous data cannot be written into the GRF 15 and the receiver 14 returns "Busy Ack" to the transmitting appliance 12. The transmitting appliance 12 to which "Busy Ack" has been returned tries to again transmit the same asynchronous packet within a time period during which asynchronous transmission is allowed.

On the other hand, in the case that the reception signal "c" is the isochronous packet, the reception signal "c" is written into the GRF 15 when the GRF state signal "d" is not "Full", whereas the reception signal "c" is discarded when the GRF state signal "d" is "Full".

The packets which have been written into the GRF 15 are successively read by a separator 16 in the order of the packet writing order, and are separated into the isochronous data "a" and the asynchronous data "b" based on the headers of the packets. Thus, the isochronous data "a" is inputted into an isochronous data processing block 17, and the asynchronous data "b" is entered into an asynchronous data processing block 18.

In the arrangement as shown in FIG. 4, even when the buffer memory having the sufficient memory capacity to the communication amount of the isochronous data is provided with the isochronous data processing block 17, and the buffer memory having the memory capacity corresponding to several asynchronous data packets is provided with the asynchronous data processing block 18, there is a problem. That is, when the reading speed of the asynchronous data packet is delayed as compared with the communication cycle, and more asynchronous data successively arrive, then the GRF 15 also becomes "Full" after the buffer memory employed in the asynchronous type data processing block 18 overflows.

Under such a circumstance, when the received packet is the asynchronous packet, "Busy Ack" is returned to the transmitting appliance 12. When the received packet is the isochronous packet, this isochronous packet is discarded.

As explained before, as to the asynchronous packet, the transmitting appliance 12 retransmits this asynchronous packet and the receiving appliance 11 again can receive it. However, the isochronous packet must be continuously received. However, since only one GRF 15 is provided with the receive buffer, there is only one sort of Full flag for both the isochronous data and the asynchronous data.

Thus, in order not to discard the isochronous data, if the Full flag is neglected and the isochronous packet is continuously written into the GRF 15, when the GRF 15 is under "Full" condition, this isochronous packet would overwrite the asynchronous data.

Since the "OK Ack" has been returned when the asynchronous packet was written into the GRF 15, the transmitting appliance 12 judges that the data packet was received under normal conditions, and therefore does not retransmit the data packet. Accordingly, this asynchronous packet will be lost.

The present invention has been made to solve such problems, and has an object to provide a signal receiving apparatus having a buffer with a minimum buffer size, capable of receiving an isochronous packet without any interruption and also of receiving an asynchronous packet without any loss.

SUMMARY OF THE INVENTION

To solve the above-described problem, the present invention is directed to a signal receiving apparatus such that in a communication system wherein both of isochronous data regularly transmitted and asynchronous data irregularly transmitted are transmitted via a common bus, the received isochronous data and asynchronous data are written into temporary storage means different from each other.

In this communication system, the isochronous data and the asynchronous data are transmitted within the same cycle having a constant time period in a time division manner. Then, when the asynchronous data is received and this asynchronous data can be written into the temporary storage means, the reception acknowledge signal is sent out to the appliance on the transmitter end.

The isochronous data is, for instance, control data of a video appliance.

In accordance with the present invention, since there are provided the temporary storage means for the isochronous data and also the temporary storage means for the asynchronous data, it is possible to avoid the condition that the isochronous data is lost because the temporary storage means is fully filled with the asynchronous data.

As previously explained, in accordance with the present invention, since the temporary storage means for storing the data packets sent from the receiver are separately provided with respect to the isochronous data and the asynchronous data, interruptions in receiving the isochronous data can be prevented and also the asynchronous data can be received without any loss without increasing the memory capacity of the overall temporary storage means.

BRIEF DESCRIPTION OF THE DRAWINGS

For a better understanding of the present invention, reference is made of the detailed description to be read in conjunction with the accompanying drawings, in which:

FIG. 4 is a schematic block diagram for showing the conventional data receiving portion of the electronic appliance employed in the communication system.

BRIEF DESCRIPTION OF THE PREFERRED EMBODIMENTS

Referring now to drawings, a signal receiving apparatus according to the present invention will be described.

Figure 1:
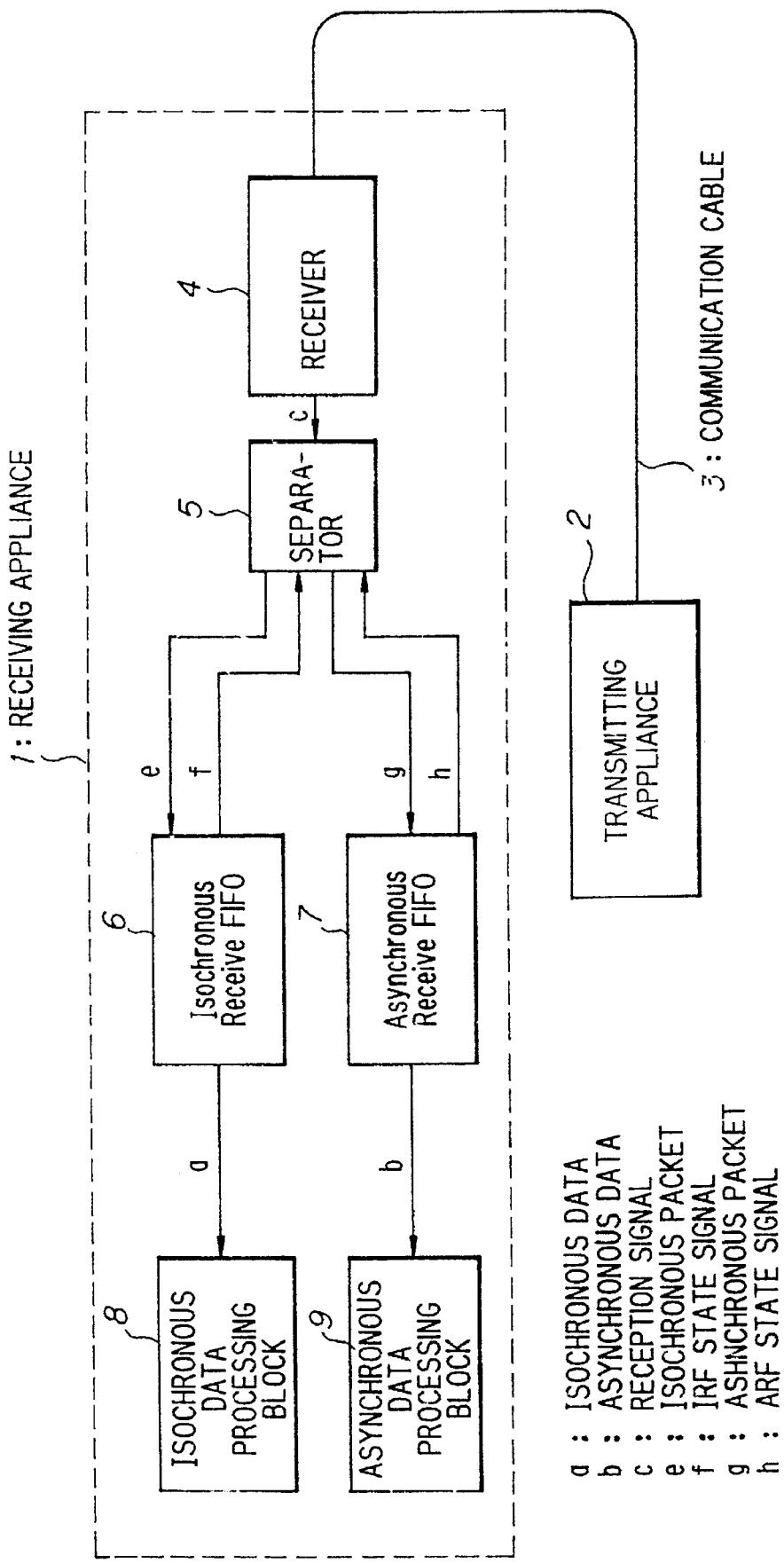
FIG. 1 is a schematic block diagram for showing a data receiving portion of a signal receiving apparatus according to an embodiment of the present invention.
Figure 2:
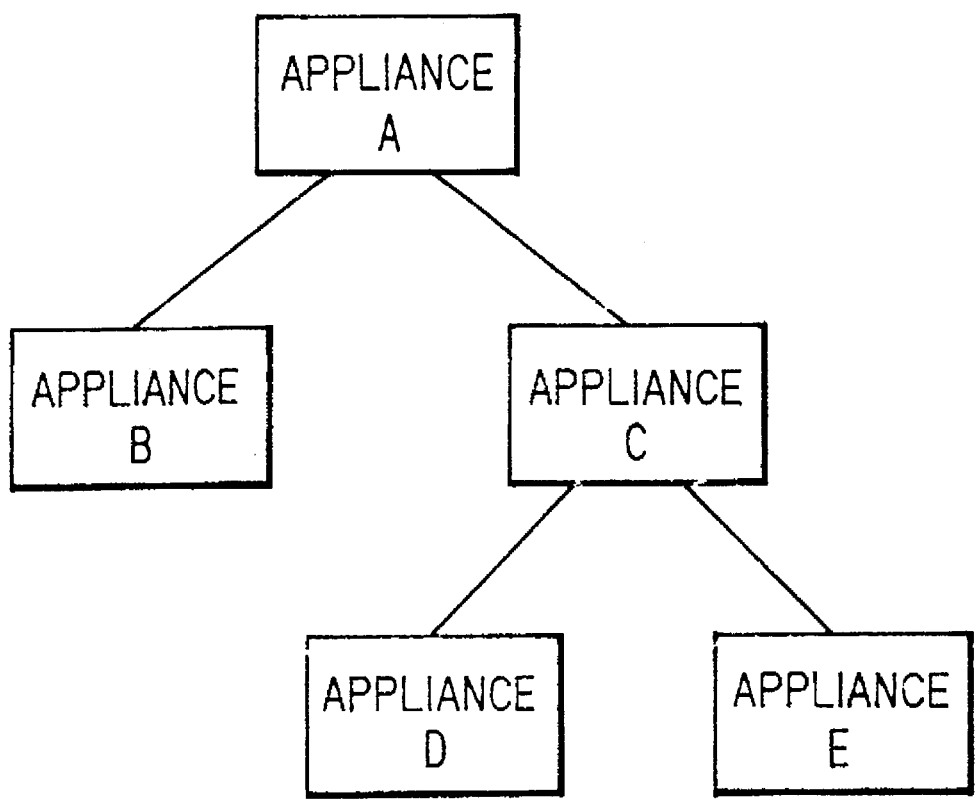
FIG. 2 schematically illustrates an example of the communication system with employment of the P1394 serial bus.
Figure 3:
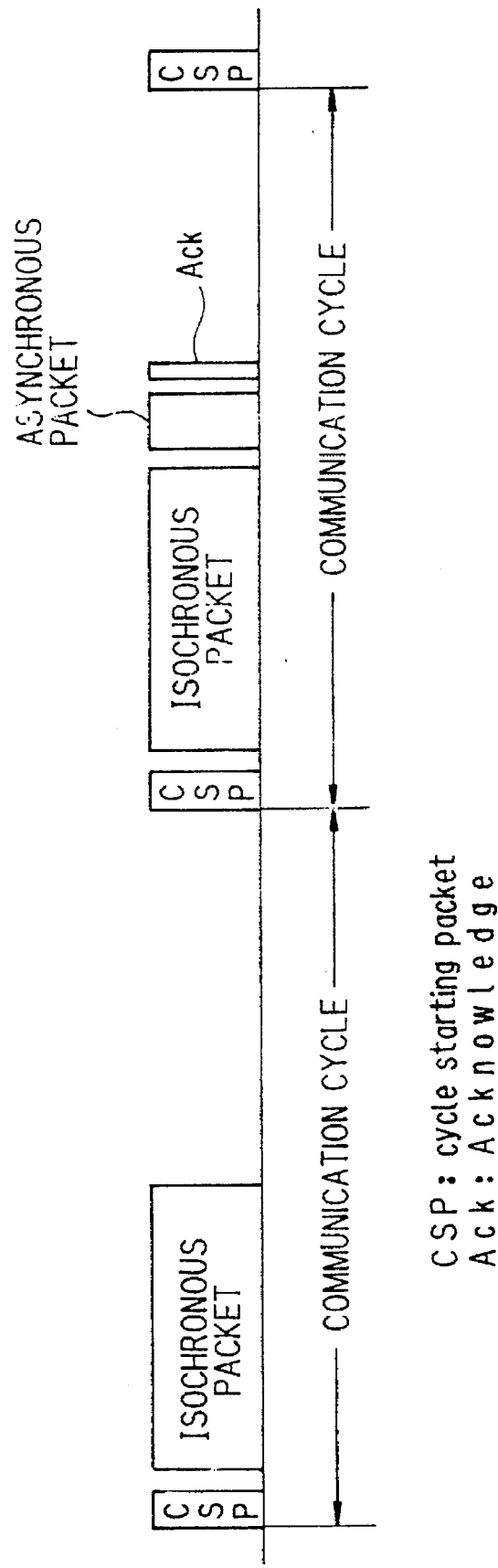
FIG. 3 schematically represents an example of the communication cycle in the communication system with employment of the P1394 serial bus.

FIG. 1 is a schematic block diagram for representing a data receiving portion of a signal receiving apparatus according to an embodiment of the present invention.

In FIG. 1, data transmitted from a transmitting appliance 2 is entered via a communication cable 3 to a receiver 4 of a receiving apparatus 1. When a received asynchronous packet is directed to the receiver 1, that is when a destination address of a header of the packet received by the receiver 4 corresponds to the node ID of the receiving apparatus 1, the receiving appliance 1 sends the asynchronous packet to a separator 5. Also when a channel number allocated to the receiving apparatus 1 and the transmitting appliance 2 for the communication purpose is written in the received isochronous packet, this received isochronous packet is sent to the separator 5.

The separator 5 discriminates the isochronous packet from the asynchronous packet based on a packet identification code written into the header of the packet. Then, when an IRF state signal "f" entered from an Isochronous Receive FIFO (an "IRF" hereinafter) 6 is not "Full", an isochronous packet "e" is written into the IRF 6.

Also, when an ARF state signal "h" entered from a Asynchronous Receive FIFO (an "ARF" hereinafter) 7 is not "Full", an asynchronous packet "g" is written into the ARF 7, and then such a fact that the asynchronous packet "g" has been written into the ARF 7 is notified to the receiver 4. Upon receipt of this notification, the receiver 4 returns "OK Ack" to the transmitting appliance 2.

On the other hand, when the ARF state signal "h" is "Full", the asynchronous packet "g" is not written into the ARF 7 but is discarded, and the fact that this asynchronous packet "g" has been discarded is communication to the receiver 4. Upon receipt of this notification, the receiver 4 returns "Busy Ack" to the transmitting appliance 2. As previously explained, even if the asynchronous packet is not written into the ARF 7 but is discarded, when the appliance which has transmitted this asynchronous packet receives "Busy Ack", this appliance can recognize that although this asynchronous packet has arrived at the destination appliance, this destination appliance could not receive this asynchronous packet due to a Busy state. Then, since the asynchronous packet can be retransmitted from this appliance, this asynchronous packet is not lost.

The isochronous packet "e" written into the IRF 6 is read out by an isochronous data processing block 8 in the packet writing order, and a predetermined process is carried out thereto. Similarly, the asynchronous packet "g" written into the ARF 7 is read out by an asynchronous data processing block 8 in the packet writing order, and a predetermined process is carried out thereto.

When the isochronous data "a" and the asynchronous data "b" are read out from the IRF 6 and the AFR 7, the FIFOs are emptied. The subsequent isochronous packet "e" and the asynchronous packet "g" can be written therein.

As a consequence, as to the data length of the isochronous packet and the number of received isochronous packet within the communication cycle, and also the read/write timings to the FIFOs, the capacities of the FIFOs in the IRF 6 may be selected in such a way that the IRF 6 is not "Full" under normal conditions, so that the asynchronous data can be received without losing the isochronous data.

What is claimed is:

1. A signal receiving apparatus for receiving a signal transmitted from a transmitting apparatus comprising:

means for receiving isochronous data being regularly transmitted and asynchronous data being irregularly transmitted;

a common serial bus connected to said transmitting apparatus and to said means for receiving isochronous data and asynchronous data for transferring said isochronous data and asynchronous data thereon;

temporary storage means including an isochronous first-in-first-out memory for storing isochronous data and including an asynchronous first-in-first-out memory for storing asynchronous data; and a separator having outputs connected to said temporary storage means and an input connected to said means for receiving isochronous data and asynchronous data for separating said isochronous data from said asynchronous data and transferring said separated isochronous data to said isochronous first-in-first-out memory and said separated asynchronous data to said asynchronous first-in-first-out memory.

2. A signal receiving apparatus according to claim 1 wherein:

both of said isochronous data and said asynchronous data are transmitted within a same cycle of a predetermined time period in a time division manner.

3. A signal receiving apparatus according to claim 2 wherein:

in a case when said asynchronous data is received and said asynchronous data can be written into said temporary storage means, a reception notification signal is returned to said transmitting apparatus.

4. A signal receiving apparatus according to claim 3 wherein said isochronous data is video data and said asynchronous data is control data of a video appliance.

5. A signal receiving apparatus according to claim 1 wherein both of said isochronous data and said asynchronous data are transmitted within a same cycle of a predetermined time period in a time division manner.

6. A signal receiving apparatus according to claim 5 wherein in a case when said asynchronous data is received and said asynchronous data can be written into said signal is returned to said transmitting apparatus.

7. A signal receiving apparatus according to claim 6 wherein said isochronous data is video data and said asynchronous data is control data of a video appliance.

8. A signal receiving apparatus according to claim 7 wherein said isochronous data and said asynchronous data are packet signals.

* * * * *